United States Patent
McKendry et al.

(10) Patent No.: US 9,719,657 B2
(45) Date of Patent: Aug. 1, 2017

(54) LOW-PROFILE OPTICAL WARNING SYSTEM

(71) Applicant: Hazard Systems Pty LTD, Launceston (AU)

(72) Inventors: Scott McKendry, Trevallyn (AU); Carl George, East Launceston (AU)

(73) Assignee: Hazard Systems Pty Ltd., Launceton (AU)

( * ) Notice: Subject to any disclaimer, the term of this patent is extended or adjusted under 35 U.S.C. 154(b) by 233 days.

(21) Appl. No.: 14/735,014

(22) Filed: Jun. 9, 2015

(65) Prior Publication Data
US 2016/0363288 A1 Dec. 15, 2016

(51) Int. Cl.
| | |
|---|---|
| *F21V 5/04* | (2006.01) |
| *F21V 5/00* | (2015.01) |
| *G08G 1/095* | (2006.01) |
| *B60Q 1/26* | (2006.01) |
| G02B 3/00 | (2006.01) |
| G02B 19/00 | (2006.01) |
| B29D 11/00 | (2006.01) |
| G02B 3/08 | (2006.01) |
| F21S 8/10 | (2006.01) |
| F21V 23/00 | (2015.01) |
| F21Y 115/10 | (2016.01) |
| F21Y 113/13 | (2016.01) |

(52) U.S. Cl.
CPC ............ *F21V 5/045* (2013.01); *B60Q 1/2611* (2013.01); *B60Q 1/2696* (2013.01); *F21V 5/007* (2013.01); *G08G 1/095* (2013.01); *B29D 11/00269* (2013.01); *F21S 48/212* (2013.01); *F21S 48/215* (2013.01); *F21S 48/2212* (2013.01); *F21V 5/008* (2013.01); *F21V 23/005* (2013.01); *F21Y 2113/13* (2016.08); *F21Y 2115/10* (2016.08); *G02B 3/005* (2013.01); *G02B 3/08* (2013.01); *G02B 19/0009* (2013.01); *G02B 19/0066* (2013.01)

(58) Field of Classification Search
CPC ....... F21V 5/045; F21V 5/007; B60Q 1/2611; B60Q 1/2696; G08G 1/095
USPC ................................ 359/742, 743, 619–630
See application file for complete search history.

(56) References Cited

U.S. PATENT DOCUMENTS

| | | | |
|---|---|---|---|
| 4,904,069 A * | 2/1990 | Nakata .................. | C03B 11/082 359/710 |
| 5,636,915 A * | 6/1997 | Cassarly .............. | G02B 6/0006 362/298 |
| 8,833,978 B2 * | 9/2014 | Wu ......................... | F21V 5/045 359/742 |

(Continued)

*Primary Examiner* — Jong-Suk (James) Lee
*Assistant Examiner* — Christopher E Dunay
(74) *Attorney, Agent, or Firm* — Stoel Rives LLP (57) ABSTRACT

An optical warning system comprises a light head that includes a light source emitting light rays from a light-emitting area. The light rays propagate through an optical diffuser to provide a visual warning signal to an observer remotely located from the optical warning system. A Fresnel optic array positioned between the optical diffuser and the light-emitting area is spaced apart from and spatially aligned with the light-emitting area to receive the light rays emitted from the light-emitting area and form a collimated light beam. The Fresnel optic array is fabricated so that it exhibits increased optical transmission efficiency by reducing light lost to scattering in forming the collimated light beam.

9 Claims, 7 Drawing Sheets

(56) References Cited

U.S. PATENT DOCUMENTS

| | | | | |
|---|---|---|---|---|
| 8,840,268 B2* | 9/2014 | Datz | ............... | B60Q 1/2611 |
| | | | | 362/235 |
| 9,453,632 B2* | 9/2016 | Kang | ............... | F21S 48/215 |
| 2006/0082886 A1* | 4/2006 | Yakushiji | ............ | G02B 3/0031 |
| | | | | 359/620 |
| 2009/0195403 A1* | 8/2009 | Du Plessis | .......... | B60Q 1/2611 |
| | | | | 340/815.73 |
| 2010/0019689 A1* | 1/2010 | Shan | ................ | G09F 9/33 |
| | | | | 315/294 |
| 2010/0110660 A1* | 5/2010 | Brukilacchio | ...... | B60Q 1/2611 |
| | | | | 362/84 |
| 2010/0165489 A1* | 7/2010 | Tobita | .............. | G02B 3/08 |
| | | | | 359/742 |
| 2013/0027951 A1* | 1/2013 | Takahashi | ............. | B60Q 1/085 |
| | | | | 362/465 |
| 2013/0051055 A1* | 2/2013 | Omidfar | ............ | B60Q 1/2611 |
| | | | | 362/520 |
| 2015/0124315 A1* | 5/2015 | Sasahara | ............... | G02B 3/005 |
| | | | | 359/457 |
| 2016/0003451 A1* | 1/2016 | Beijer | .............. | F21V 5/002 |
| | | | | 362/308 |
| 2016/0377250 A1* | 12/2016 | Ohno | ............... | F21S 48/115 |
| | | | | 362/521 |

* cited by examiner

LOW-PROFILE OPTICAL WARNING SYSTEM

COPYRIGHT NOTICE

©2015 Hazard Systems Pty LTD. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This disclosure relates to optical warning systems and, in particular, to a low-profile optical warning system that is composed of light-emitting modules implemented with Fresnel arrays and optical diffusers.

BACKGROUND INFORMATION

Warning light signals are generally used to clear the right of way or to warn oncoming motorists of potential moving or stationary hazards, such as a vehicle that is stopped or a vehicle moving slower or faster than the rate of traffic. Warning light signals may also be used to provide specific directions to motorists, such as merge right or merge left or pull over. Some vehicles incorporate an arrow board or even a text matrix display to generate warning light signals to direct traffic.

The use of emergency beacons is restricted by law in many jurisdictions for only responding to an emergency, initiating a traffic stop, bona fide training exercises, or when a specific hazard exists in the road.

SUMMARY OF THE DISCLOSURE

An optical warning system comprises a light head that includes a light source emitting light rays from a light-emitting area. The light rays propagate through an optical diffuser to provide a visual warning signal to an observer remotely located from the optical warning system. A Fresnel optic array positioned between the optical diffuser and the light-emitting area is spaced apart from and spatially aligned with the light-emitting area to receive the light rays emitted from the light-emitting area and form a collimated light beam.

The Fresnel optic array has first and second opposite major surfaces, of which the first major surface has multiple concentric ring facets positioned nearer to the optical diffuser and of which the second major surface is flat and positioned nearer to the light-emitting area. The multiple concentric ring facets form separate inner and outer groups, the concentric ring facets in the inner group having facet spacings that are greater than facet spacings of the concentric ring facets in the outer group. Each of the multiple ring facets in the outer group occupies an annular region in which a draft facet and an adjacent optical facet are joined to form a rounded peak. The draft facet is inclined at a draft angle, and the rounded peak is defined by a peak radius. The draft angle and peak radius are set to values that are coordinated to cause incident light rays emitted from the light-emitting area to propagate through the optical facet and not through the draft facet and the rounded peak. This increases optical transmission efficiency of the Fresnel optic array by reducing light lost to scattering by the rounded peak in forming the collimated light beam.

Additional aspects and advantages will be apparent from the following detailed description of preferred embodiments, which proceeds with reference to the accompanying drawings.

DETAILED DESCRIPTION OF PREFERRED EMBODIMENTS

Figures 1A, 1B:
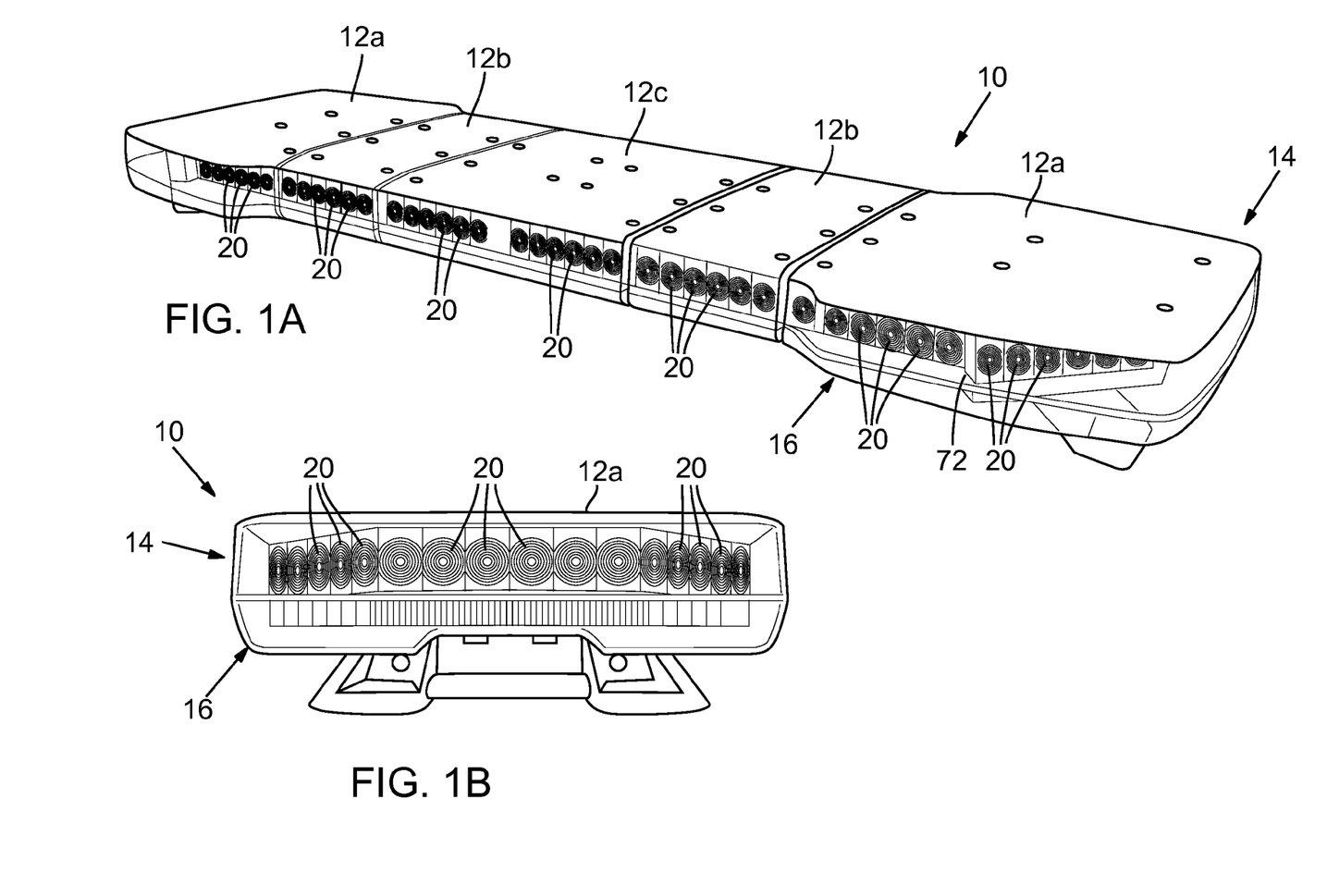
FIGS. 1A and 1B are respective perspective and end views of an embodiment of an optical warning system in the form of a two-level light bar composed of a set of five housing modules.

FIGS. 1A and 1B are respective perspective and end views of an embodiment of an optical warning system in the form of a two-level light bar 10 composed of a set of five housing modules. With reference to FIGS. 1A and 1B, the set of five housing modules includes two outboard-type housing modules 12a positioned adjacent different ones of two short center-type housing modules 12b, which are positioned adjacent either side of a long center-type housing module 12c. Each one of housing modules 12, 12b, and 12c (collectively, "housing modules 12") has an upper level 14, which performs a primary emergency warning lighting function, and a lower level 16, which either provides white auxiliary lighting or performs amber-colored traffic director functions.

Figure 2A:
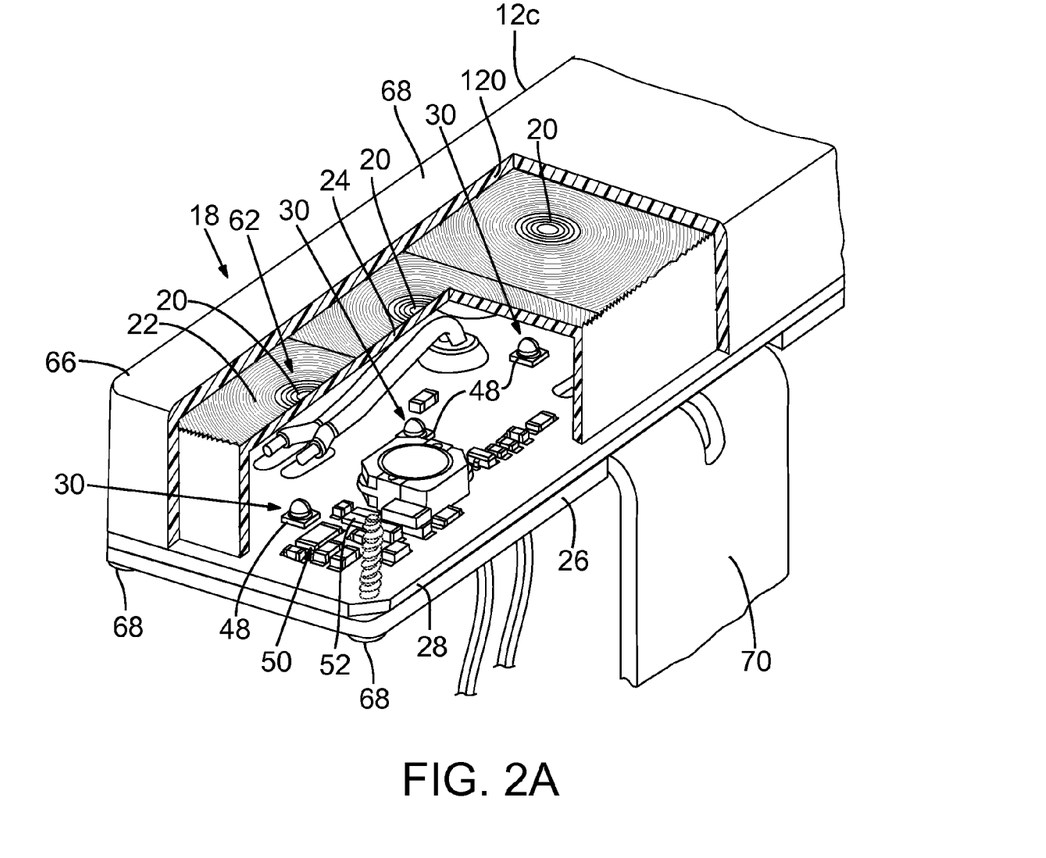
FIGS. 2A and 2B are respective fragmentary and exploded views of a light bar light-emitting diode (LED) module that is installed in the upper level of one of housing modules of the optical warning system of FIGS. 1A and 1B.
Figure 2B:
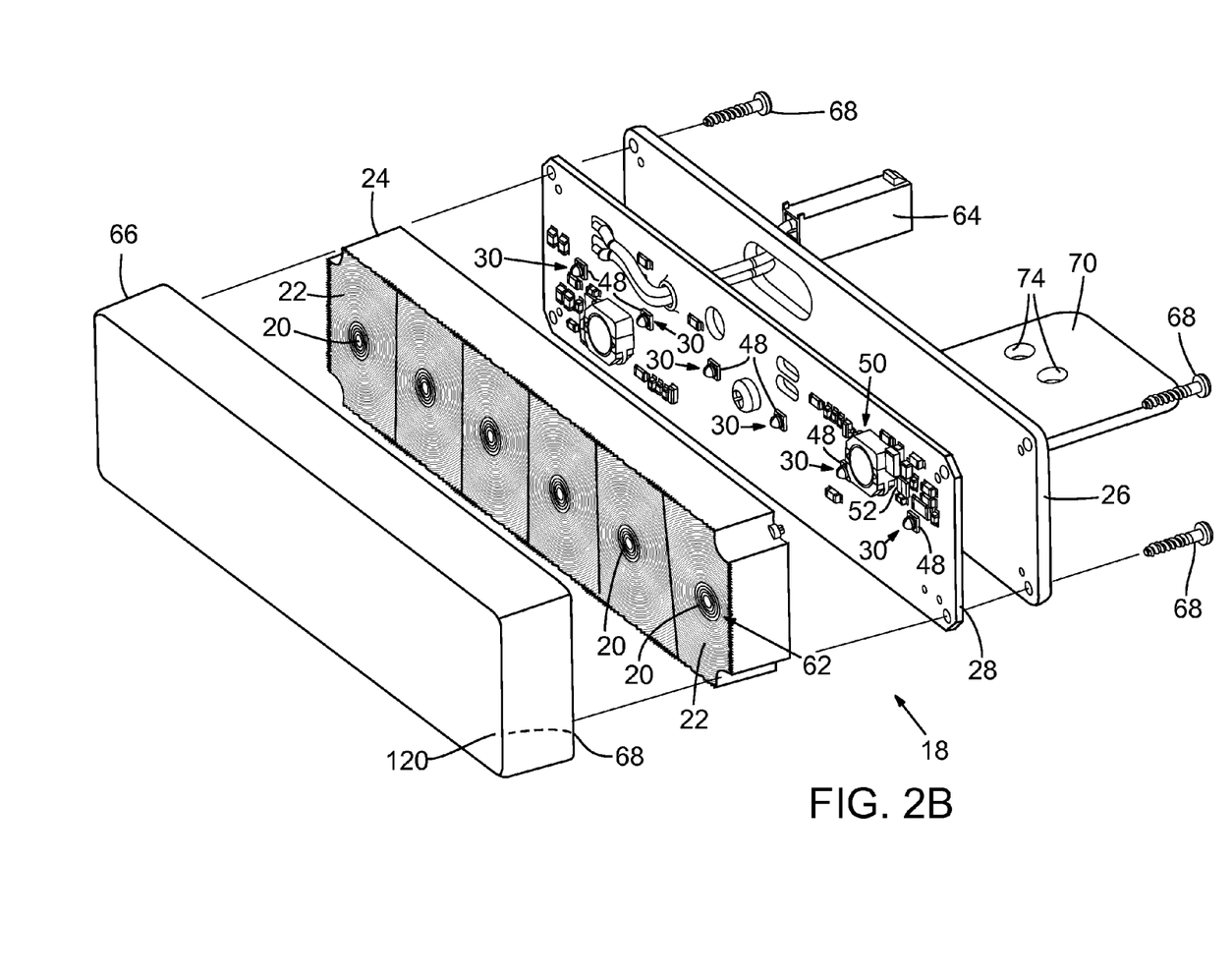

FIGS. 2A and 2B are respective fragmentary and exploded views of a light bar light-emitting diode (LED) module 18 that is installed in upper level 14 of one of housing modules 12. FIG. 2A has portions of LED module 18 cut away to show its interior optical and electronic components. Each of housing modules 12 of FIGS. 1A and 1B is configured to enclose multiple LED modules 18. With reference to FIGS. 1A, 1B, 2A, and 2B, each of LED modules 18 mounted in upper level 14 includes multiple Fresnel optic arrays 20 formed on an exterior surface 22 of an optic cover 24. The center-to-center pitch between adjacent Fresnel optic arrays 20 is preferably 22 mm; and the length, width, and depth of optic cover 24 are preferably 132.9 mm, 32.9 mm, and 13.821 mm, respectively. Each one of LED modules 18 includes a base plate 26 that supports a printed circuit board 28 on which the electronic components are mounted. Base plate 26 is in heat transfer communication with and functions as a heat sink for printed circuit board 28. FIGS. 1A and 1B show that housing modules 12 containing LED modules 18 are arranged to provide a visual warning signal with effective coverage throughout 360°. Auxiliary or traffic director lighting modules mounted in lower level 16 of light bar 10 are based on a light reflector design that is incidental to the subject matter of this disclosure.

Each of multiple light-emitting areas 30 defined on printed circuit board 28 includes one or more surface mount LEDs 48 (three and six light-emitting areas 30, each with one LED 48, shown in FIGS. 2A and 2B, respectively) and electronic drive circuitry 50. A microcontroller 52 mounted on printed circuit board 28 provides electrical signals to LEDs 48 and drive circuitry 50 to selectively energize them. A power supply circuit 64 connected to printed circuit board 28 provides the electric power to operate LED module 18. Each Fresnel optic array 20 formed on optic cover 24 includes a lens portion 62 that is positioned above and in spatial alignment with light-emitting area 30 to receive light rays emitted by LED 48. A lens cover 66 having an interior surface onto which an optical diffuser 68 is placed comprises a portion of LED module 18 that cover light-emitting areas 30 and transmits light emitted from them. Screws 68 (three shown) pass through axially aligned holes at the corners of base plate 26, printed circuit board 28, optic cover 24, and lens cover 66 to secure them together and thereby form LED module 18. LED module 18 is attached to upper level 14 of light bar 10 by a mounting bracket 70 extending from base plate 26 and secured to a platform 72 by fasteners (not shown) passing through holes 74 in mounting bracket 70.

Figure 3:
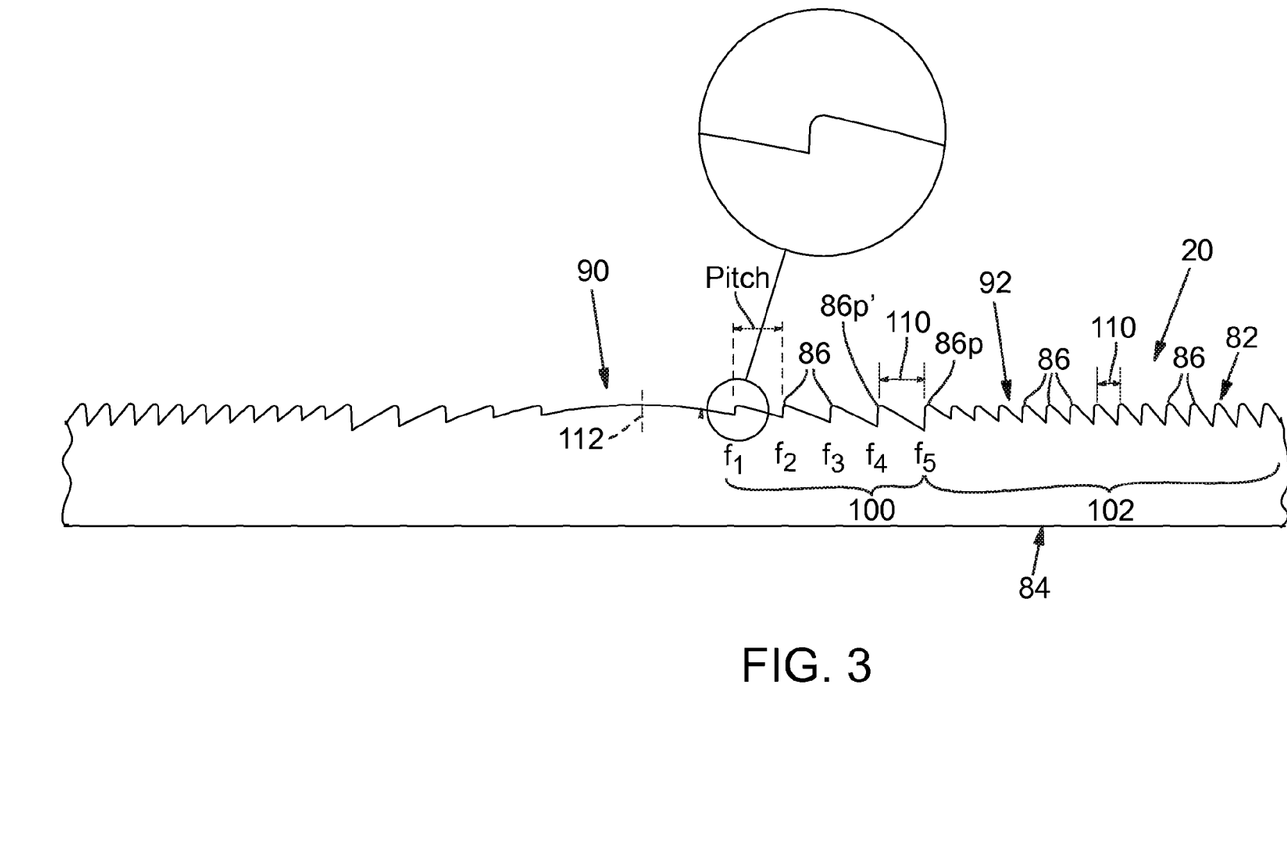
FIG. 3 is an enlarged fragmentary cross-sectional view of a fine pitch Fresnel optic array employed in the optical warning system of FIGS. 1A and 1B.

FIG. 3 shows an enlarged fragmentary cross-sectional view of a fine pitch Fresnel optic array 20. With reference to FIG. 3, Fresnel optic array 20 has a first or front major surface 82 and a second or back, opposite major surface 84. Front major surface 82 has multiple concentric ring facets 86 positioned nearer to optical diffuser 68, and back major surface 84 is a flat surface positioned nearer to light-emitting area 30. Fresnel optic array 20 efficiently captures a large portion and creates a tightly collimated beam of light emitted by LED 48, thereby imaging the LED die structure. Fresnel optic array 20 is designed so that its front major surface 82 appears as a continuous light-emitting surface. FIG. 3 shows a convex center portion 90 and part of a faceted portion 92 of Fresnel optic array 20. Fresnel optic array 20 has very small feature sizes to prevent an observer's eyes from readily resolving its alternate light-emitting and light non-emitting surfaces, as described below.

Figure 4:
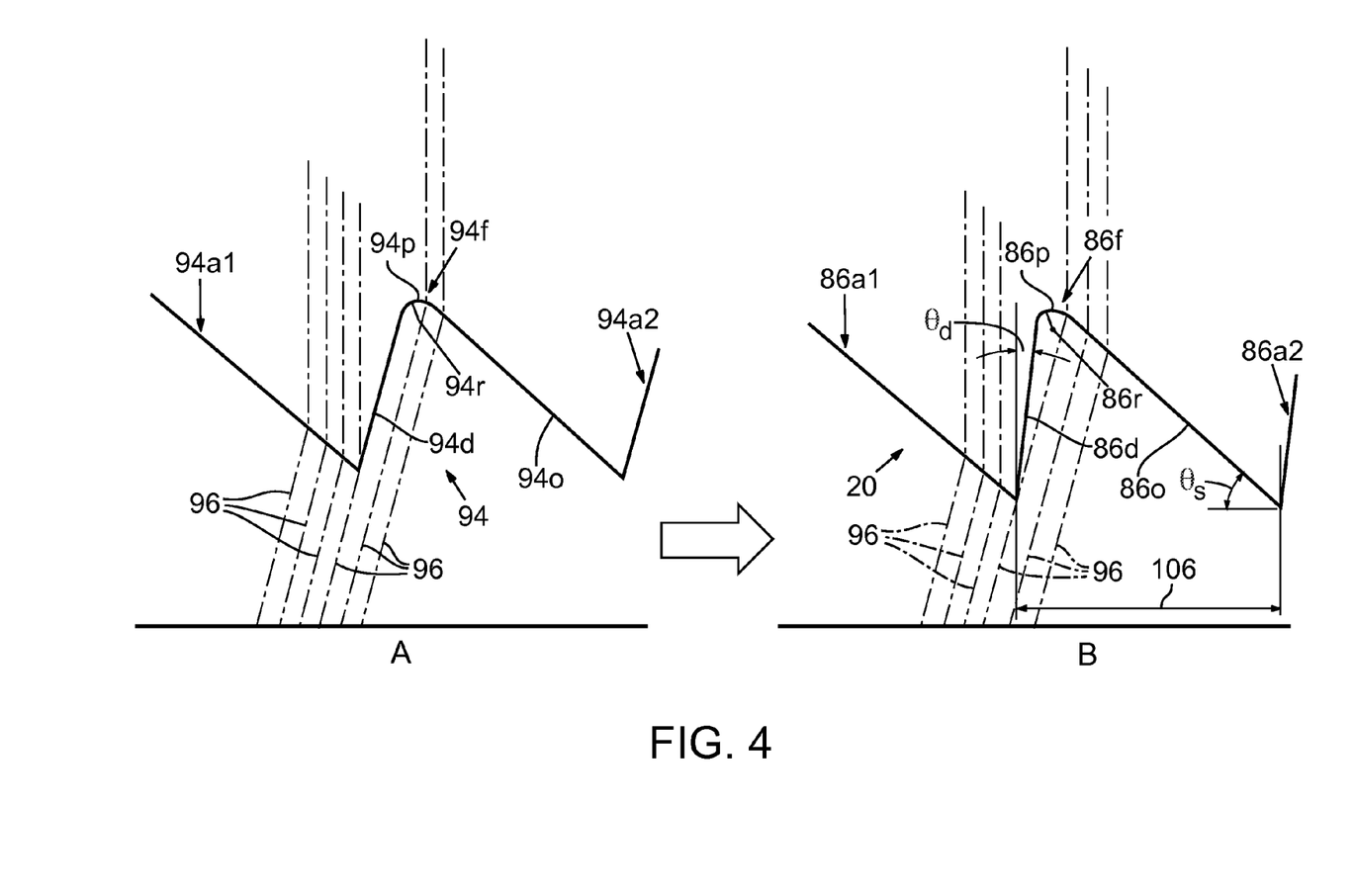
FIG. 4 is a pair of diagrams presenting a side-by-side comparison between the feature profile of a standard Fresnel lens (left-hand feature diagram "A") and the feature profile of the disclosed Fresnel optic array (right-hand feature diagram "B") of FIG. 3.

Single Point Diamond Turning (SPDT) is a preferred process performed to create fine pitch Fresnel features in poly (methyl methacrylate) (PMMA) material. FIG. 4 is a pair of diagrams presenting a side-by-side comparison between the feature profile of a standard Fresnel lens 94 (left-hand feature diagram "A") and the feature profile of the disclosed Fresnel optic array 20 (right-hand feature diagram "B").

Feature diagram A of FIG. 4 shows a ring facet 94f and portions of adjacent ring facets 94a1 and 94a2 of standard Fresnel lens 94 through which a bundle of light rays 96 propagates. Ring facet 94f occupies an annular region, in which a draft facet 94d and an adjacent optical facet 94o are joined to form a rounded peak 94p defined by a peak radius 94r. Draft facet 94d and optical facet 94o are, respectively, the non-optical surface and optical surface of standard Fresnel lens 94. Radius 94r is required at peak 94p because it is a trough in the SPDT injection mold tool. An SPDT mold tool requires radii on all internal corners to enable removal of the molded part from the tool. A molded SPDT Fresnel lens has many internal corners because of the fine feature pitch. Radius 94r at peak 94p of standard Fresnel lens 94 removes material from optical facet 94o and thereby reduces light transmission efficiency. These regions of the optical surface from which material is removed scatter light rays 96 instead of collimating them.

Feature diagram B of FIG. 4 shows a ring facet 86f, which is designed to eliminate the reduction in light transmission efficiency resulting from scattering of light rays 96. The elimination of the reduction of light transmission efficiency is accomplished by machining the radius of the rounded peak within the non-optical surface, i.e., the draft facet. Feature diagram B of FIG. 4 shows ring facet 86f and portions of adjacent facets 86a1 and 86a2 of Fresnel optic array 20, through which the bundle of light rays 96 propagates in accordance with the present disclosure.

With reference to FIG. 3 and feature diagram B of FIG. 4, multiple concentric ring facets 86 are divided into an inner group 100 and an outer group 102 extending radially outwardly from convex circular center portion 90. Each ring facet 86 occupies an annular region 106, in which a draft facet 86d and an optical facet 86o are joined to form a rounded peak 86p defined by a peak radius 86r. Draft facet 86d is inclined at a draft angle $\Theta_d$, and optical facet 86o is inclined at a slope angle $\Theta_s$. A facet spacing or ring pitch 110 is defined as the distance between peaks 86p of adjacent ring facets 86.

To achieve the desired optical characteristics by providing alternate light-emitting and light non-emitting surfaces, Fresnel optic array 20 is designed to have, to the extent possible, optical facets 86o function as light-emitting surfaces (i.e., the refractive surfaces) and draft facets 86d function as light non-emitting surfaces (i.e., the non-optical surfaces). This is accomplished by reducing draft angles $\Theta_d$ and thereby forming rounded peaks 86p with radius 86r moved into the non-optical surfaces, i.e., draft facets 86d. The general ring pitch of the features of Fresnel optical array is 0.3 mm. Draft surfaces 86d located near an optic array center 112 of Fresnel optic array 20 (i.e., draft surfaces 86d of ring facets 86 of inner group 100) tend toward a vertical orientation (i.e., draft angles $\Theta_d$ approach 0°). Reducing draft angles $\Theta_d$ of ring facets 86 located near optic array center 112 becomes infeasible because their draft surfaces 86d would tilt beyond vertical and create undercuts. The design of Fresnel optic array 20 accepts a small number of radii 86r of rounded peaks 86p that extend into draft facets 86d and thereby reduce optical transmission efficiency. The number of such radii is minimized by providing inner group 100 of ring facets 86 with increased ring pitch 110 relative to that of ring facets 86 in outer group 102. In a preferred embodiment, inner group 100 includes five of the innermost ring facets 86 with increasing ring pitch 110, 1.2 mm for the center ring facet 86 and 0.6 mm for each of the next four ring facets 86. Outer group 102 includes the twenty remaining ring facets 86, each having a 0.3 mm general ring pitch 110. The thickness of Fresnel optic array 20 is 1.5 mm±0.05 mm, measured from optic array center 112 to back major surface 84.

The optical design of Fresnel optic array 20 incorporates machining radii allowances into its non-optical regions. As described above, these radii are present to allow the SPDT process to create the tooling inserts of the injection mold tool. These radii are located in the troughs of the SPDT mold tool. If these radii were simply added to the feature profile of a standard Fresnel lens with no modification to the non-optical surfaces, a significant portion of light would be lost to scattering. By reducing draft angles $\Theta_d$, a small radius 86r can be added to each of the troughs in the region where no light would be emitting (non-optical surfaces 86d). This allows for the manufacture of injection-molded SPDT Fresnel optics while minimizing losses from the tooling and machining processes.

The resultant PMMA part is a more accurate representation of the computer aided design (CAD) data used to machine ring facet features. An alternative method to produce the Fresnel lens features with draft angles that are essentially vertical is not an option for the design of Fresnel optic array 20. The reason is that the effective focal point of Fresnel optic array 20 is short (10.5 mm below flat surface 84) and the area of light-emitting surface 82 (22.75 mm×32.9 mm) is relatively large, such that the enclosed angle required for tooling the Fresnel facets would be outside of SPDT tooling limitations and, therefore, could not be manufactured.

When LED module 18 is installed in light bar 10, optical diffuser 68 creates an effective warning coverage angle by dispersing in a desired pattern the collimated beam of light propagating from Fresnel optic array 20. A small portion of the light is allowed to pass undiverged through a front surface 120 of optical diffuser 68 to give an intense warning signal directly in front, but the bulk remainder of the light is diverged horizontally in a controlled manner to create an efficient, highly effective warning signal around upper level 14 of light bar 10. A preferred optical diffuser 68 is a light shaping diffuser manufactured from polycarbonate material that is of clear color and in which the diffuser surface is the inside face of an interchangeable tool insert. The diffuser surface (FWHM) texture is preferably 95° H×10° V with 2 mm border (ECE). Alternative diffuser surface (FWHM) textures include 60° H×1° V with 2 mm border, 4 vertical stripes, and 1 horizontal stripe (SAE) or 10° with 2 mm border (SPOT). Other dispersion characteristics are readily achieved by different inserts into the tool. The appearance of the optical output of light bar 10 using the ECE diffuser surface, from the standpoint of an observer, is that of a continuous light emitting surface.

Figure 5:
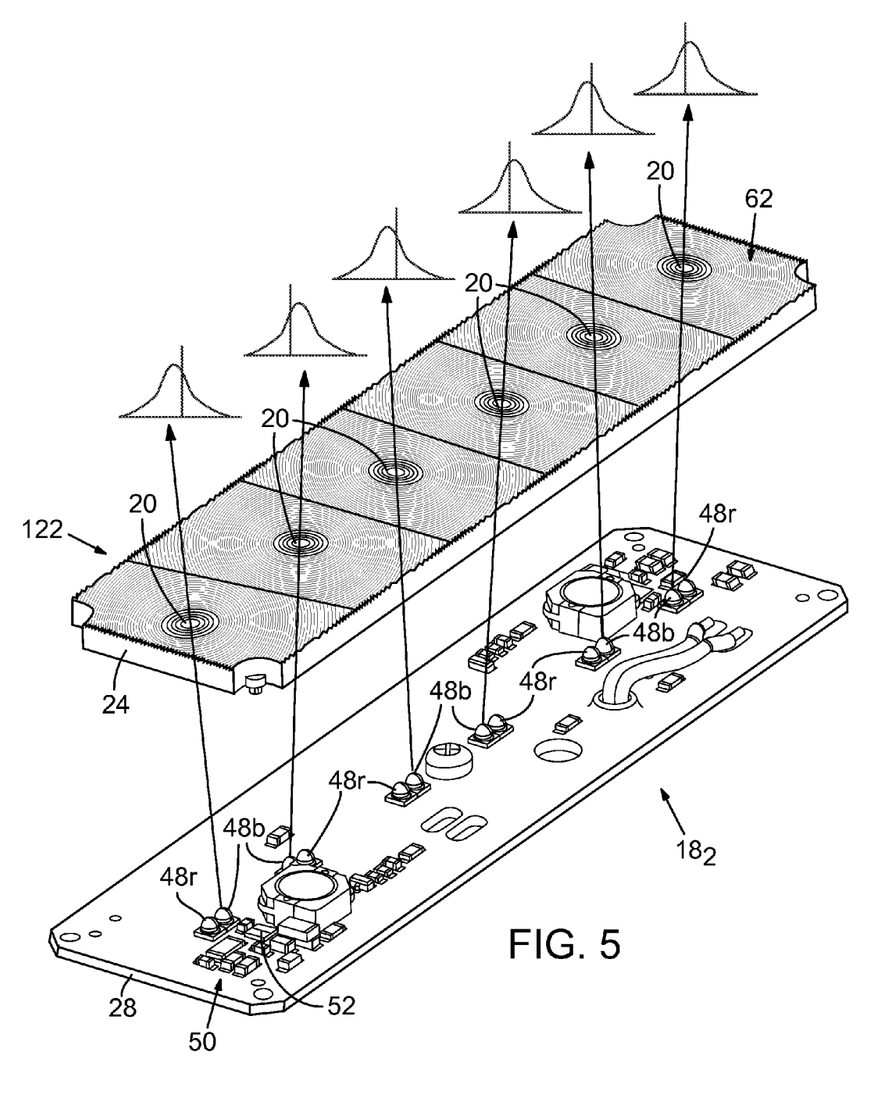
FIG. 5 shows the placement of red and blue LEDs underneath the Fresnel optic array of FIG. 3 to create a two-color LED warning light configuration.

LED module 18 shown in FIGS. 2A and 2B is a single color module (i.e. red, blue, amber, white, and green). FIG. 5 is an exploded pictorial view of a set of six two-color light sources mounted on printed circuit board 28 beneath a cluster 122 of six Fresnel optic arrays 20 housed in an LED module 18$_2$ (of which only optic cover 24 and printed circuit board 28 are shown in FIG. 5). With reference to FIG. 5, module 18$_2$ is manufactured as a two-color system, with a pair of LEDs 48r and 48b positioned adjacent each other along the horizontal axis (i.e., axis extending parallel to the plane and along the length of printed circuit board 28) under the focal point of each Fresnel optic array 20. In this configuration, Fresnel optic array 20 functions as a first stage that produces two off-axis collimated beams diverging in the horizontal direction. Optical diffuser 68 functions as a second stage that averages the light by dispersing it at a significantly greater horizontal angle than the two collimated beam divergence beam angle and that subsequently produces a two-color light output appearing not to exhibit positional change of the light source.

FIG. 5 shows the intended placement of LEDs 48r and 48b underneath Fresnel optic array 20 to create the two-color LED warning light configuration. The ordering of LEDs 48r and 48b in each adjacent pair is interchanged, such that the combined output of red light is symmetrical about 0° horizontally and the combined output of blue light is symmetrical of about 0° horizontally. The graphs superimposed on FIG. 5 and set above cluster 122 of the six Fresnel optic arrays 20 are representations of the light output corresponding to the graph shown in FIG. 6. Inspection of FIG. 5 reveals that there are three blue LEDs 48b focused slightly left and three blue LEDs 48b focused slightly right. The same can be seen with LEDs 48r. The order of a pair of LEDs 48r and 48b in a light source is the reverse of that for the pair of LEDs 48r and 48b in an adjacent light source of the set of six two-color light sources. Staggering of the two colors further negates the effects of the positional offset of the LED output.

Figure 6:
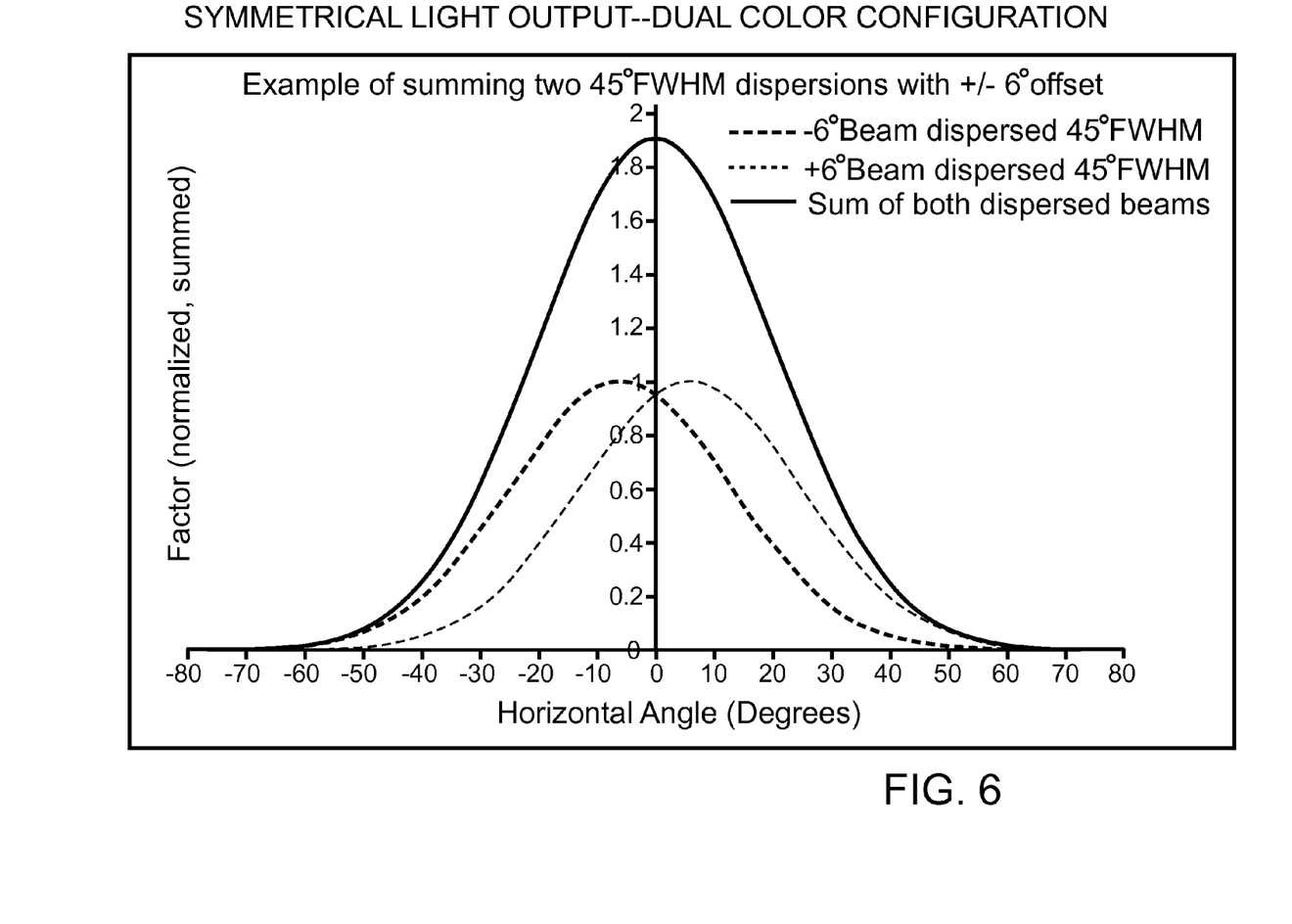
FIG. 6 is a graph showing an example of summing two 45° full-width, half-maximum (FWHM) dispersions with ±6° horizontal offset of light emitted by the red and blue LEDs of FIG. 5.

FIG. 6 is a graph showing an example of summing two 45° full width, half-maximum (FWHM) dispersions with ±6° horizontal offset. With reference to FIG. 6, the two 45° FWHM normalized LEDs 48r and 48b (dashed lines) with offsets of −6° and +6° combine to produce a symmetrical output centered about 0° (solid line). This principle is used to produce two-color LED modules 18$_2$, with each color filling the entire module front surface and having a symmetrical light output pattern using Fresnel optic array 20 in combination with optical diffuser 68.

For two-color applications, there is a significant benefit to the geometry of Fresnel optic array 20 in that back major (flat) surface 84 is relatively far away (i.e., 10.5 mm) from LEDs 48r and 48b. If LEDs 48r and 48b are of small dimensions and are placed symmetrically adjacent to each other in the horizontal axis, as close as manufacturer tolerances will permit, they will be set at a distance of 1.75 mm from the focal point of Fresnel optic array 20. Fresnel optic array 20 collimates each LED 48r and 48b sufficiently but aims the collimated beams in a slightly different direction horizontally.

Another benefit of the design of optical warning system 10 is that it affords relative freedom of component placement within the enclosure of Fresnel optic array 20. This allows for other electronic components, such as LEDs 48r and 48b, to be readily mounted onto the same printed circuit board assembly, thereby extending the possible applications to, for example, standalone LED surface-mount modules.

The combination of fine-pitch SPDT Fresnel optic array 20 with optical diffuser 68 provides a unique low-profile optical warning system 10.

It will be obvious to those having skill in the art that many changes may be made to the details of the above-described embodiments without departing from the underlying principles of the invention. The scope of the present invention should, therefore, be determined only by the following claims.

The invention claimed is:

1. In an optical warning system comprising a light head that includes a light source emitting light from a light-emitting area, the light propagating through an optical diffuser to provide a visual warning signal to an observer remotely located from the optical warning system, the improvement comprising:

a Fresnel optic array positioned between the optical diffuser and the light-emitting area, the Fresnel optic array spaced apart from and spatially aligned with the light-emitting area to receive the light emitted from the light-emitting area and having a principal axis and a focal point, and the Fresnel optic array having first and second opposite major surfaces, of which the first major surface has multiple concentric ring facets positioned nearer to the optical diffuser and of which the second major surface is flat and positioned nearer to the light-emitting area;

the multiple concentric ring facets forming separate inner and outer groups, the concentric ring facets in the inner group having facet spacings that are greater than facet spacings of the concentric ring facets in the outer group;

each of the multiple ring facets in the outer group occupying an annular region in which a draft facet and an adjacent optical facet are joined to form a rounded peak, the draft facet inclined at a draft angle and the rounded peak defined by a peak radius, the draft angle and peak radius set to values that are coordinated to cause incident light emitted from the light-emitting area to propagate through the optical facet and not through the draft facet and the rounded peak thereby to increase optical transmission efficiency of the Fresnel optic array by reducing light lost to scattering by the rounded peak in forming a collimated light beam; and the light source including a pair of light-emitting diodes, the pair of light-emitting diodes positioned at substantially equal distances from and on opposite sides of the focal point of the Fresnel optic array and emitting beams of light of different first and second colors, and the Fresnel optic array producing, from the beams of light of different first and second colors emitted by the pair of light-emitting diodes, two substantially collimated light beams pointing in opposite directions from the principal axis of the Fresnel optic array, and the diffuser dispersing the two substantially collimated light beams to form a diffused light intensity pattern that is symmetrical about, and has a peak intensity that lies on, the principal axis of the Fresnel optic array.

2. The optical warning system of claim 1, in which each one of the pair of light-emitting diodes is positioned a distance away from the flat major surface under the focal point of the Fresnel optic array.

3. The optical warning system of claim 1, in which the inner group includes fewer of the multiple concentric ring facets than those in the outer group.

4. The optical warning system of claim 1, in which the peak radius of the rounded peak is no greater than about 0.04 mm.

5. In an optical warning system comprising a light head that includes multiple light sources emitting light from multiple light-emitting areas, the light propagating through an optical diffuser to provide a visual warning signal to an observer remotely located from the optical warning system, the improvement comprising:

a cluster of multiple Fresnel optic arrays positioned between the optical diffuser and the multiple light-emitting areas, the cluster having alternating first and second sets of the multiple Fresnel optic arrays, each one of the multiple Fresnel optic arrays spaced apart from and spatially aligned with an associated one of the multiple light-emitting areas and having a principal axis and a focal point;

each of the multiple Fresnel optic arrays having first and second opposite major surfaces, of which the first major surface has multiple concentric ring facets positioned nearer to the optical diffuser and of which the second major surface is flat and positioned nearer to the associated light-emitting area;

the multiple concentric ring facets of each of the multiple Fresnel optic arrays forming separate inner and outer groups, the concentric ring facets in the inner group having facet spacings that are greater than facet spacings of the concentric ring facets in the outer group;

each of the multiple ring facets in the outer group occupying an annular region in which a draft facet and an adjacent optical facet are joined to form a rounded peak, the draft facet inclined at a draft angle and the rounded peak defined by a peak radius, the draft angle and peak radius set to values that are coordinated to cause incident light emitted from the associated light-emitting area to propagate through the optical facet and not through the draft facet and the rounded peak thereby to increase optical transmission efficiency of the Fresnel optic array by reducing light lost to scattering by the rounded peak in forming a collimated light beam;

the multiple light sources including a pair of light-emitting diodes associated with each of the multiple Fresnel optic arrays in the first and second sets, positioned at substantially equal distances from and on opposite sides of the focal point of the associated Fresnel optic array, and emitting beams of light of different first and second colors, the pairs of light-emitting diodes associated with the alternating first and second sets emitting the beams of light of different first and second colors in, respectively, a first positional order and a second positional order that is the reverse of the first positional order; and each of the Fresnel optic arrays in the first and second sets producing, from the beams of light of different first and second colors emitted by the associated pair of light-emitting diodes, two substantially collimated light beams pointing in opposite directions from the principal axis of the Fresnel optic array, and the diffuser dispersing the two substantially collimated light beams to form a diffused light intensity pattern that is symmetrical about, and has a peak intensity that lies on, the principal axis of the Fresnel optic array.

6. The optical warning system of claim 5, in which each of the light-emitting diodes is positioned a distance away from the flat major surface under the focal point of the Fresnel optic array.

7. The optical warning system of claim 5, in which the inner group includes fewer of the multiple concentric ring facets than those in the outer group.

8. The optical warning system of claim 5, in which the peak radius of the rounded peak is no greater than about 0.04 mm.

9. The optical warning system of claim 5, in which the multiple light sources including a pair of light-emitting diodes associated with each of the multiple Fresnel optic arrays in the first and second sets are mounted on a common circuit board.

* * * * *